US011645094B2

(12) United States Patent
Sakai

(10) Patent No.: US 11,645,094 B2
(45) Date of Patent: May 9, 2023

(54) INFORMATION PROCESSING APPARATUS, INFORMATION PROCESSING METHOD, AND STORAGE MEDIUM

(71) Applicant: CASIO COMPUTER CO., LTD., Tokyo (JP)

(72) Inventor: Toru Sakai, Yokohama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/196,773

(22) Filed: Mar. 9, 2021

(65) Prior Publication Data
US 2021/0286634 A1    Sep. 16, 2021

(30) Foreign Application Priority Data
Mar. 10, 2020    (JP) .............................. JP2020-041054

(51) Int. Cl.
*G06F 9/451* (2018.01)
*G06F 3/14* (2006.01)
*H04L 67/08* (2022.01)
*H04L 67/06* (2022.01)

(52) U.S. Cl.
CPC ............ *G06F 9/452* (2018.02); *G06F 3/1454* (2013.01); *H04L 67/06* (2013.01); *H04L 67/08* (2013.01)

(58) Field of Classification Search
CPC ....... G06F 9/452; G06F 3/1454; H04L 67/08; H04L 67/06; G08C 2201/30; G08C 2201/50; G08C 17/00
See application file for complete search history.

(56) References Cited

U.S. PATENT DOCUMENTS

| 5,742,286 | A | * | 4/1998 | Kung ................... G06F 3/0486 715/733 |
| 10,860,335 | B1 | * | 12/2020 | Shurtleff ............. H04L 41/0803 |
| 2005/0246624 | A1 | | 11/2005 | Humpieman et al. |

(Continued)

FOREIGN PATENT DOCUMENTS

JP    4156660 B1    9/2008

OTHER PUBLICATIONS

EPO; Application No. 21160454.1; European Search Report dated Aug. 6, 2021.

*Primary Examiner* — Daniel W Parcher
(74) *Attorney, Agent, or Firm* — Fitch, Even, Tabin & Flannery LLP

(57) ABSTRACT

Provided is an information processing apparatus including at least one processor that executes a display control process to display a remote operation screen, a copy of an operation screen displayed on a display of a representative terminal device, for collective remote operation of multiple terminal devices in a first display region. In the display control process, in response to a user operation on the remote operation screen, the processor displays, in the first display region, a result of an input of the user operation to the representative terminal device, and displays, in a second display region, a copy of a screen that is displayed on a display of the multiple terminal devices other than the representative terminal device and that shows a result of an input of the user operation to the multiple terminal devices other than the representative terminal device, the second display region being different from the first display region.

12 Claims, 17 Drawing Sheets

(56) References Cited

U.S. PATENT DOCUMENTS

| | | | |
|---|---|---|---|
| 2009/0030971 A1* | 1/2009 | Trivedi | H04L 67/06 |
| | | | 709/203 |
| 2012/0130513 A1 | 5/2012 | Hao et al. | |
| 2012/0144347 A1* | 6/2012 | Jo | G06F 3/04817 |
| | | | 715/863 |
| 2013/0151981 A1* | 6/2013 | Green | G06F 3/0484 |
| | | | 715/744 |
| 2014/0016037 A1* | 1/2014 | Goldberg | G06F 9/452 |
| | | | 348/600 |
| 2015/0033136 A1 | 1/2015 | Sasaki et al. | |
| 2015/0186024 A1* | 7/2015 | Hong | G06F 3/04886 |
| | | | 715/800 |
| 2020/0371655 A1* | 11/2020 | Li | H04L 12/1868 |

* cited by examiner

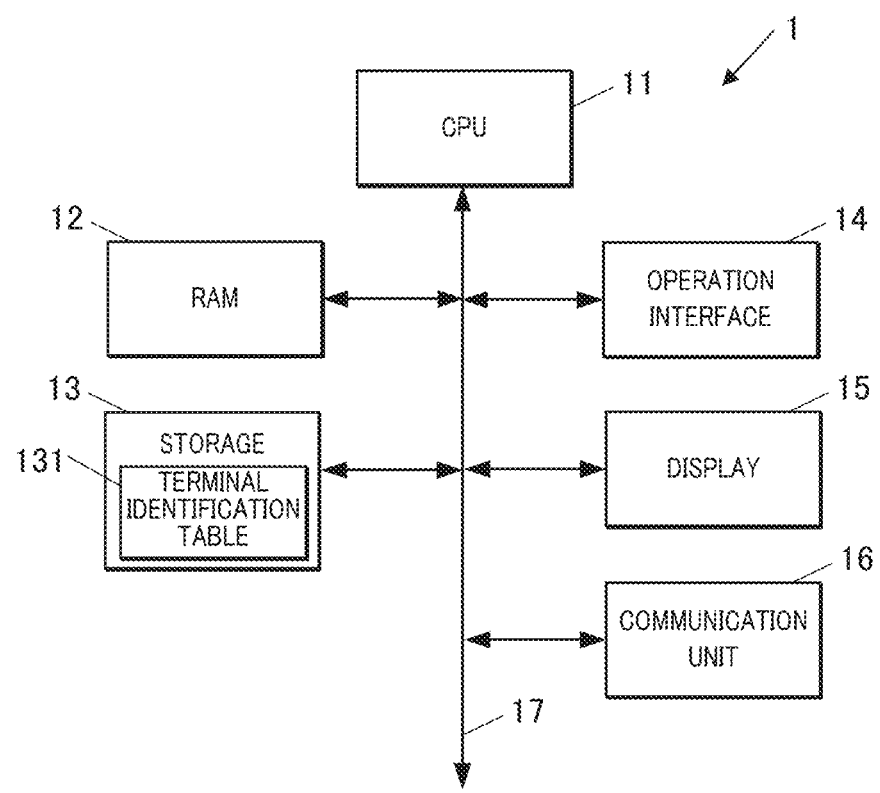

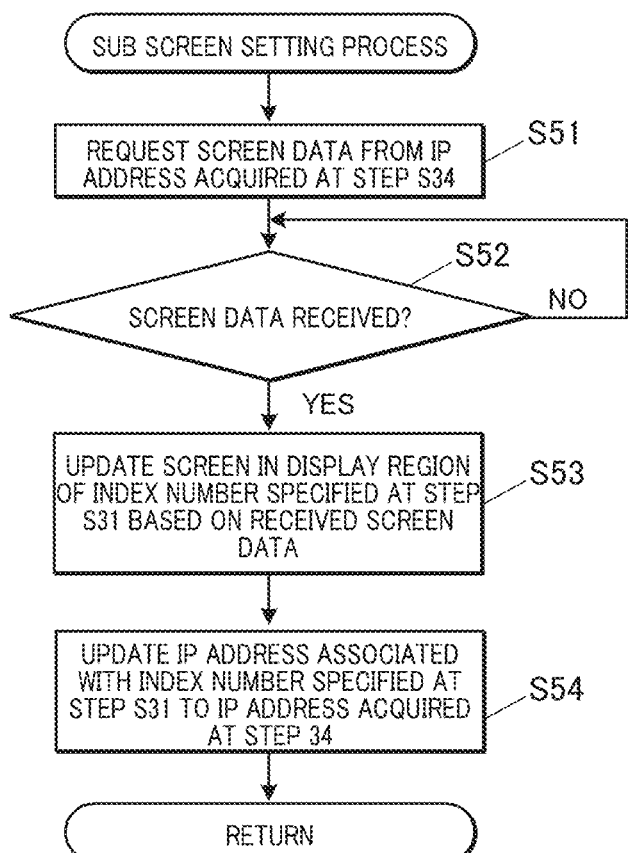
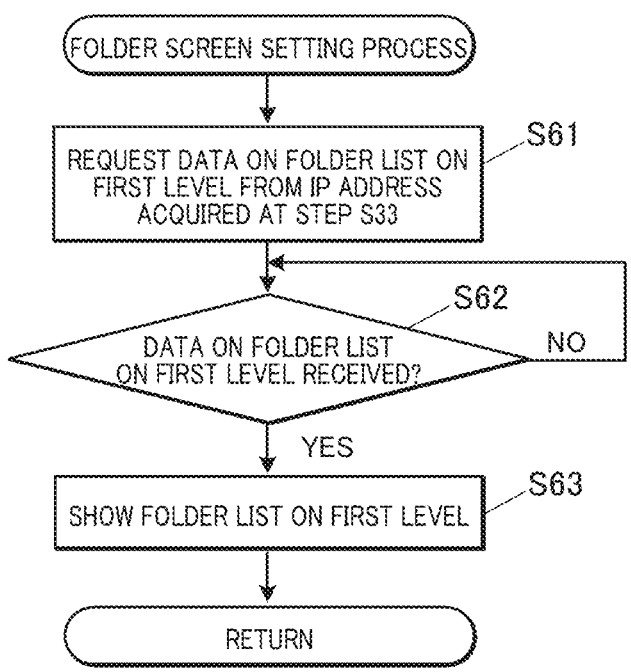

INFORMATION PROCESSING APPARATUS, INFORMATION PROCESSING METHOD, AND STORAGE MEDIUM

CROSS-REFERENCE TO RELATED APPLICATIONS

This application is based upon and claims the benefit of priority under 35 USC 119 of Japanese Patent Application No. 2020-041054 filed on Mar. 10, 2020, the entire disclosure of which is incorporated herein by reference in its entirety.

BACKGROUND OF THE INVENTION

Field of the Invention

The present invention relates to an information processing apparatus, an information processing method, and a storage medium.

Description of the Related Art

There is known a remote control system that displays information on operation screens of client terminals and selects a client terminal based on a user operation, thereby executing remote operations of the selected client terminal (for example, JP4156660B1).

However, when the remote control system disclosed in JP4156660B1 is applied in kitting, for example, that involves a number of client terminals, it is necessary to pick up the client terminals one by one and repeat the same process. That is a huge burden for the workers, and may result in errors such as oversights.

SUMMARY OF THE INVENTION

In order to solve at least one of the abovementioned problems, an information processing apparatus according to an aspect of the present invention includes:

at least one processor that executes a display control process to display a remote operation screen for collective remote operation of multiple terminal devices in a first display region, the remote operation screen being a copy of an operation screen displayed on a display of a representative terminal device of the multiple terminal devices, and wherein in the display control process, in response to a user operation on the remote operation screen, the processor:

displays, in the first display region, a result of an input of the user operation to the representative terminal device, and displays, in a second display region, a copy of a screen that is displayed on a display of the multiple terminal devices other than the representative terminal device and that shows a result of an input of the user operation to the multiple terminal devices other than the representative terminal device, the second display region being different from the first display region.

BRIEF DESCRIPTION OF THE SEVERAL VIEWS OF DRAWING

FIG. 2 is a block diagram showing a functional configuration of a management apparatus.

FIG. 3 shows an example of a terminal identification table.

FIG. 12 is a flowchart showing control steps of a sub screen setting process.

FIG. 13 is a flowchart showing control steps of a folder screen setting process.

DETAILED DESCRIPTION OF THE INVENTION

Hereinafter, an information processing apparatus, an information processing method, and a storage medium according to an embodiment are described with reference to the drawings.

<Configuration of Terminal Management System>

Figure 1:
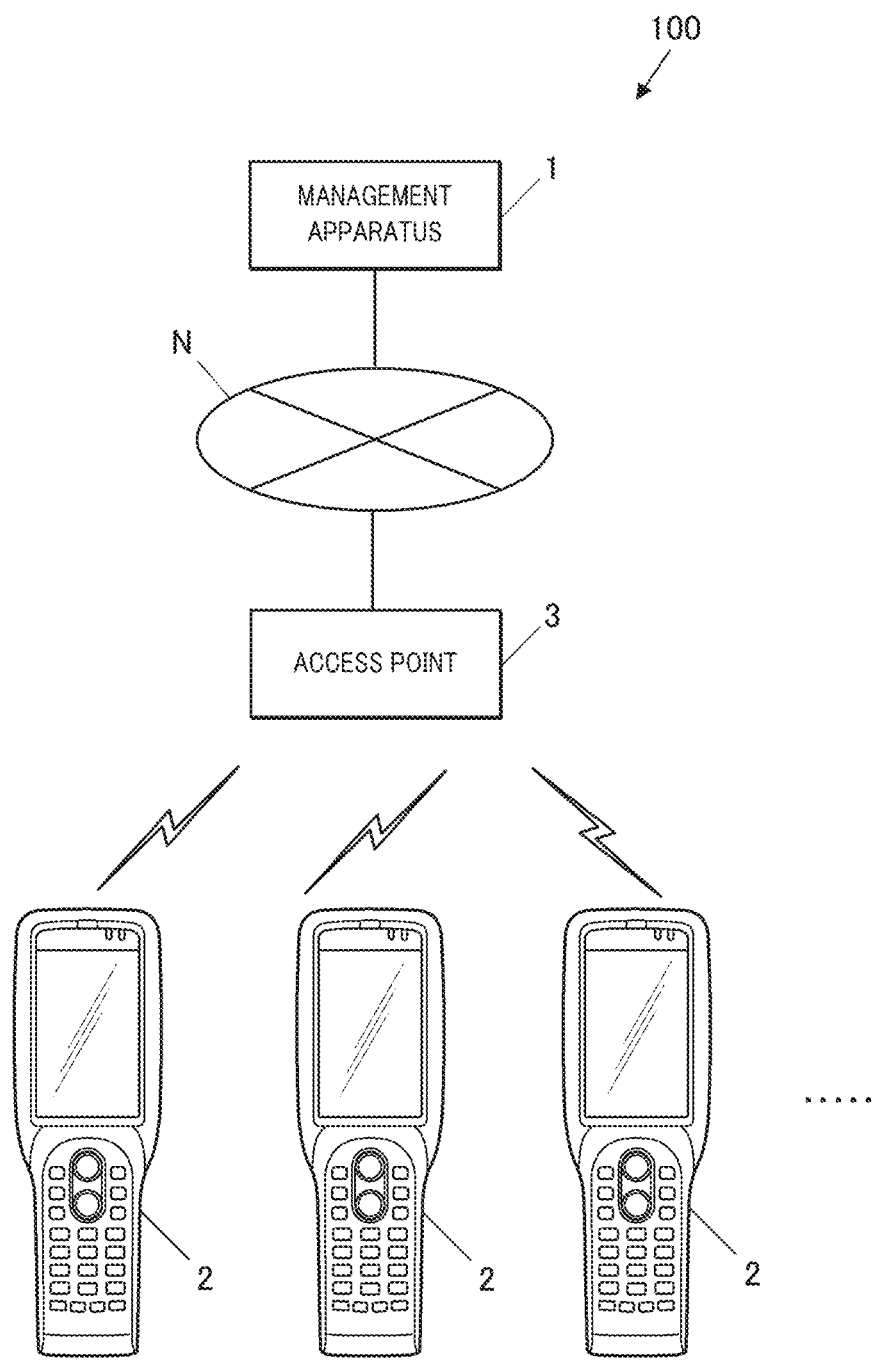
FIG. 1 shows a configuration of a terminal management system.

FIG. 1 shows a configuration of a terminal management system 100 in this embodiment.

As shown in FIG. 1, the terminal management system 100 includes a management apparatus (information processing apparatus) 1, multiple (for example, seven) handheld terminals (terminal devices) 2, and an access point 3.

The management apparatus 1 may remotely operates multiple handheld terminals 2, and is connected to the access point 3 by network. The management apparatus 1 is, for example, a laptop or a desktop computer. Hereinafter, the description is given on the premise that the environment for executing remote operation between the management apparatus 1 and each of the handheld terminals 2 has already been set up.

The handheld terminals 2 are each a terminal device that is introduced in stores such as supermarkets and mass retailers and warehouses storing products, and operated by users such as clerks and managers in such spots. The access point 3 is a relay device for the wireless LAN communication.

<Configuration of Management Apparatus>

FIG. 2 is a block diagram showing a functional configuration of the management apparatus 1.

As shown in FIG. 2, the management apparatus 1 includes a central processing unit (CPU) 11, a random access memory (RAM) 12, a storage 13, an operation interface 14, a display 15, and a communication unit 16. The components of the management apparatus 1 are connected with each other via a bus 17.

The CPU (the display control means, the first reception means, the second reception means) 11 is a processor that controls the components of the management apparatus 1. The CPU 11 reads a specified program(s) among system programs and application programs stored in the storage 13, opens the read program(s) in the RAM 12, and executes various kinds of processing in accordance with the opened program(s).

The RAM 12 is, for example, a non-volatile memory, and has a work area where various programs and data read by the CPU 11 are temporarily stored.

The storage 13 includes a storage device that can write and read data such as a hard disk drive (HDD) and a solid state drive (SSD), and stores programs and data files therein. The data to be stored in the storage 13 is, for example, a terminal identification table 131 for identifying the handheld terminals 2 to be remotely controlled in a remote control process described later.

FIG. 3 shows an example of the terminal identification table 131.

As shown in FIG. 3, in the terminal identification table 131, index numbers and IP addresses of the handheld terminals 2 are respectively associated with one another. The index number is associated with each of the first to seventh display regions R1 to R7 on a remote display screen 40 (see FIG. 6). Specifically, Index 1 is associated with the first display region R1, Index 2 with the second display region R2, Index 3 with the third display region R3, Index 4 with the fourth display region R4, Index 5 with the fifth display region R5, Index 6 with the sixth display region R6, and Index 7 with the seventh display region R7. If "123.1.68.61" is stored as an IP address associated with Index "1" in the terminal identification table 131, the screen of the handheld terminal 2 using the IP address "123.1.68.61" is displayed in the first display region R1 on the remote display screen 40.

The operation interface 14, which includes a key input unit such as a keyboard and a pointing device such as a mouse, receives a key operation input and a positional operation input from a user and outputs the operation information to the CPU 11. The CPU 11 receives an input operation from a user based on information sent from the operation interface 14.

The display 15, which includes a liquid crystal display (LCD) and an electro luminescence (EL) display, displays various kinds of information according to commands from the CPU 11.

The communication unit 16, which includes a network card, performs data communication between the devices on the communication network N under the control of the CPU 11. The communication network N may be a LAN, WAN, or the like.

<Configuration of Handheld Terminal>

Figure 4:
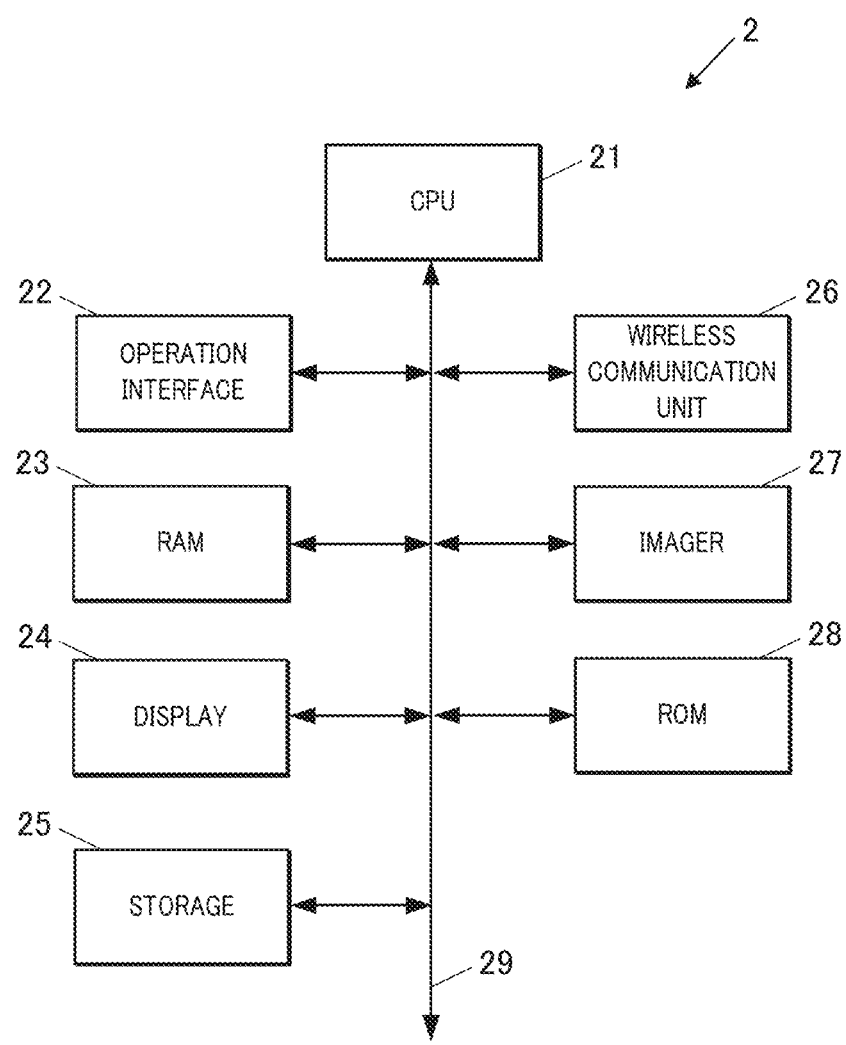
FIG. 4 is a block diagram showing a functional configuration of a handheld terminal.

FIG. 4 is a block diagram showing a functional configuration of the handheld terminal 2.

As shown in FIG. 4, the handheld terminal 2 includes a CPU 21, an operation interface 22, a RAM 23, a display 24, a storage 25, a wireless communication unit 26, and an imager 27, and a ROM 28. The components of the handheld terminal 2 are connected with one another via a bus 29.

The CPU 21 is a processor that controls the components of the handheld terminal 2. The CPU 21 reads a specified program(s) among system programs and application programs stored in the storage 25, opens the read program(s) in the RAM 23, and executes various kinds of processing in accordance with the opened program(s).

The operation interface 22, which includes various keys, receives a key operation input from a user and outputs the operation information to the CPU 21. The operation interface 22 may be provided on the display screen of the display 24, and include a touch panel that receives an input of touch by a user.

The RAM 23 is a non-volatile memory, and has a work area where various kinds of data and programs read by the CPU 21 are temporarily stored.

The display 24 displays various kinds of information according to commands from the CPU 21 on a display screen such as an LCD.

The storage 25 is a non-volatile memory such as a flash memory in and from which information is writable and readable. The storage 25 stores various kinds of data and programs therein.

The wireless communication unit 26, which includes an antenna, a demodulation/modulation circuit, and a signal processing circuit, is a communication unit using a wireless LAN communication system like Wi-Fi (registered trademark). The CPU 21 wirelessly communicate with the access point 3 via the wireless communication unit 26, and sends and receives information to and from the devices connected to the access point 3 via a network.

The imager 27, which is a digital camera with an optical system and an image sensor, images an object and generates image data thereof under the control of the CPU 21. Specifically, the imager 27 images a symbol of a two-dimensional code such as a barcode and a QR (Quick Response) code (registered trademark).

The CPU 21 decodes image data of a symbol imaged by the imager 27 and acquires data included in the two-dimensional code.

The ROM 28 is a non-volatile memory from which information is readable. The ROM 28 stores information on the handheld terminal 2 itself such as a serial number as an individual identification number uniquely allotted in manufacturing.

<Remote Control Process>

Figure 5:
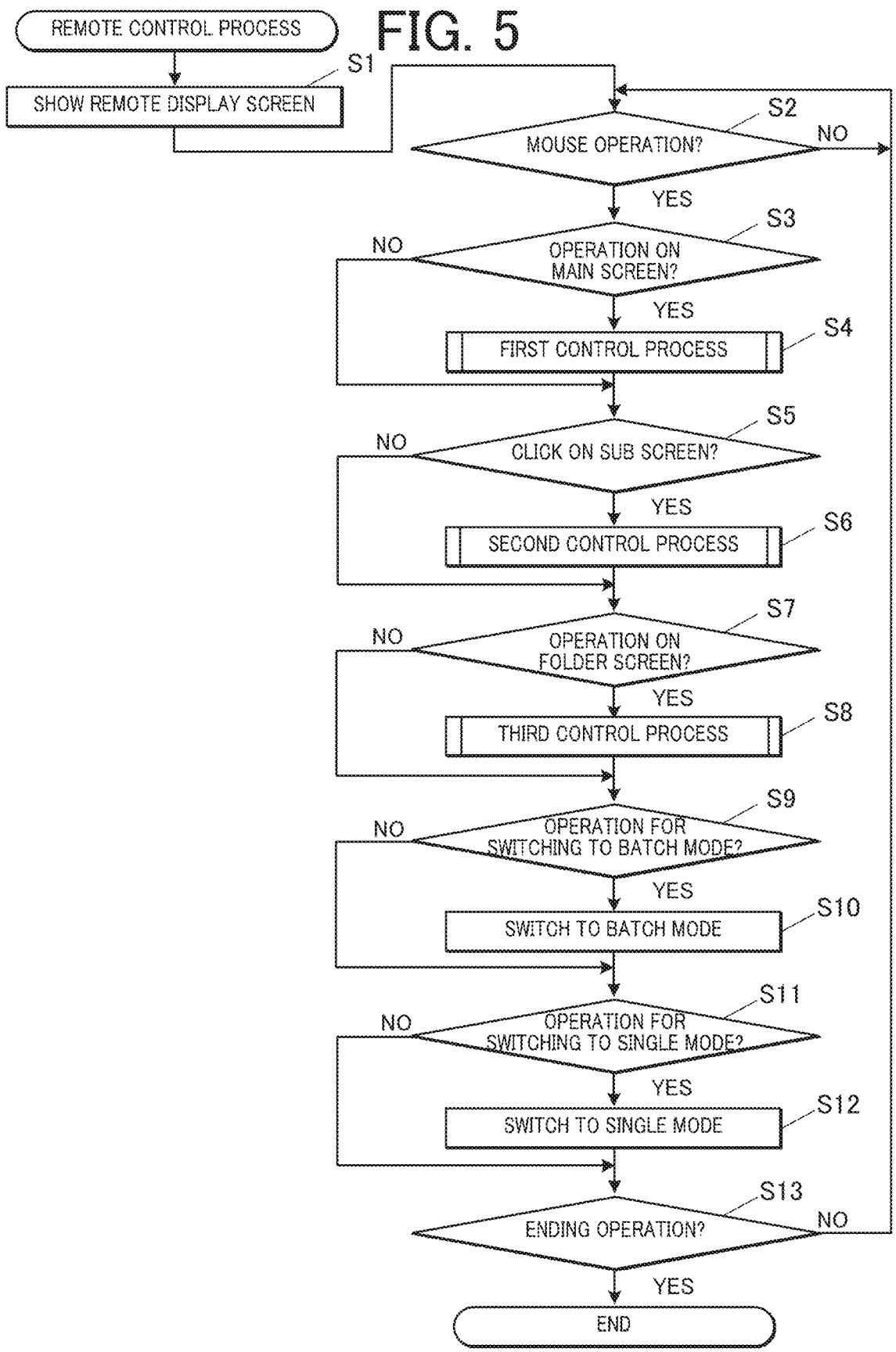
FIG. 5 is a flowchart showing control steps of a remote control process.

Next, the remote control process executed in the management apparatus 1 is described with reference to FIG. 5. FIG. 5 is a flowchart showing control steps of the remote control process.

As shown in FIG. 5, at the start of the remote control process, the CPU 11 first displays a remote display screen 40 on the display 15 (Step S1).

Figure 6:
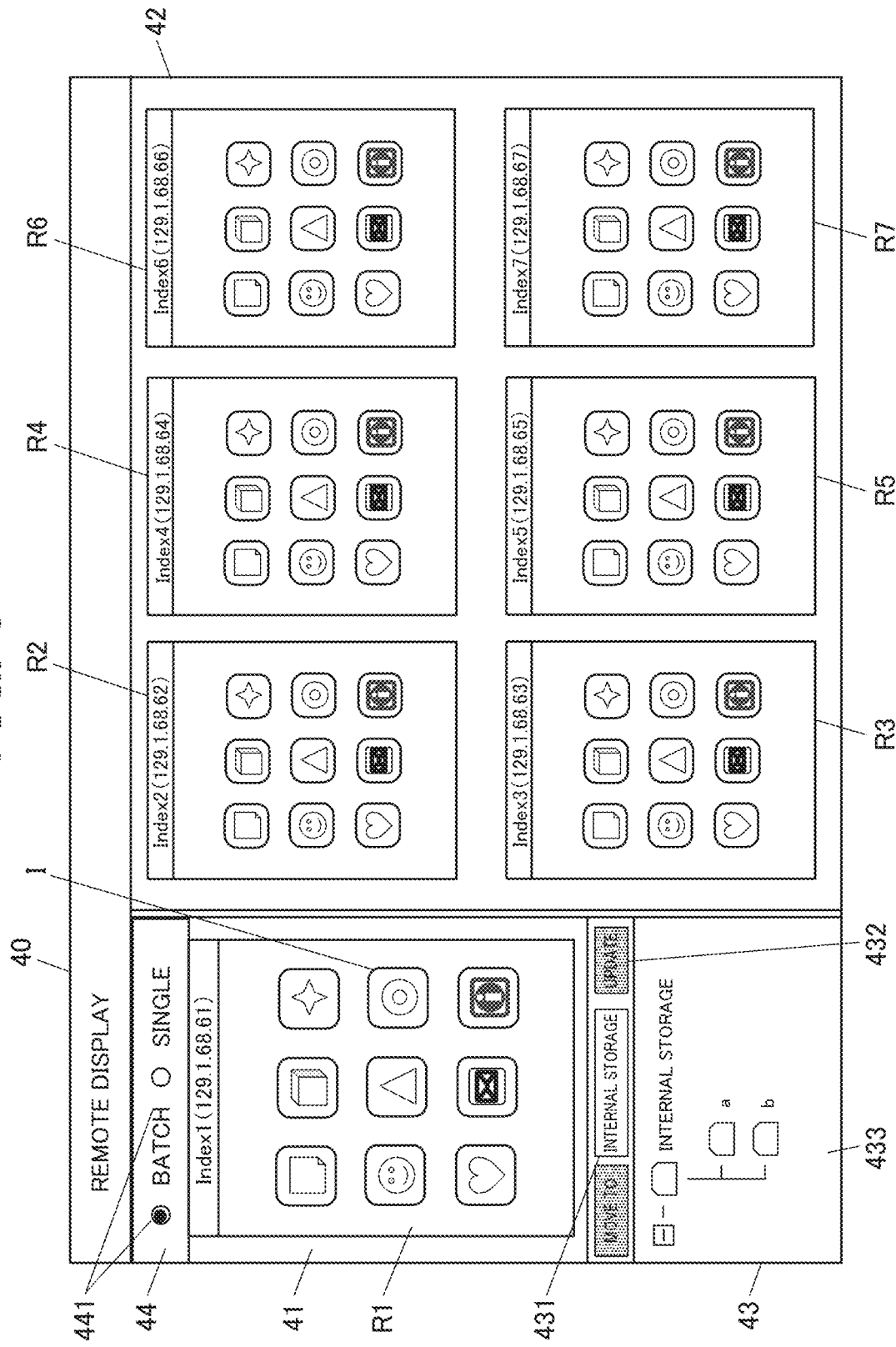
FIG. 6 shows an example of a remote display screen.

FIG. 6 shows an example of the remote display screen 40.

As shown in FIG. 6, the remote display screen 40 are split into a main screen (first display region) 41, a sub screen (second display region) 42, a folder screen (third display screen) 43, and a mode selection screen 44.

The main screen 41 is an operation screen for remote operation of the handheld terminal 2. The first display region R1 is provided in the main screen 41, and the screen displayed on the handheld terminal 2 with the IP address associated with Index 1 in the terminal identification table 131 is displayed n the first display region R1. In the example of FIG. 6, the home screen displayed on the handheld terminal 2 with the IP address "129.1.68.61" associated with Index 1 of the terminal identification table 131 is displayed in the first display region R1 of the main screen 41. The main screen 41 is provided right below the screen selection screen 44 on the upper left of the remote display screen 40 described later.

The second to seventh display regions R2 to R7 are in the sub screen 42, and the screens displayed on the handheld terminals 2 with the IP addresses respectively corresponding to Index 2 to 7 in the terminal identification table 131 are displayed in the second to seventh display regions R2 to R7.

In the example of FIG. 6, the home screen displayed on the handheld terminals 2 with the IP addresses respectively corresponding to Index 2 to 7 are displayed in the second to seventh regions R2 to R7 of the sub screen 42. The sub screen 42 is provided next to the main screen 41 on the right.

The folder screen 43 is for displaying a folder structure of the handheld terminal 2 whose operation screen is displayed in the first display region R1 of the main screen 41. An input region 431, an update button 432, and a folder structure display region 433 for displaying a folder structure are provided on the folder screen 43.

The user inputs a desired folder in the input region 431 and presses the update button 432, and thereby viewing a folder list showing the path to the desired folder in the folder structure display region 433.

The mode selection screen 44 is for selection between the batch mode and the single mode. Radio buttons 441 are provided on the mode selection screen 44 for selection between the modes.

In the batch mode, the multiple handheld terminals 2 are remotely controlled collectively. When the remote operation is done via the operation screen of the handheld terminal 2 displayed in the first display region R1 of the main screen 41, the same remote control is done on the handheld terminals 2 whose screens are displayed in the second to seventh display regions R2 to R7 of the sub screen 42. On contrary, in the single mode, one of the handheld terminals 2 is remotely controlled exclusively. The handheld terminal 2 remotely controlled in this single mode is the handheld terminal 2 whose operation screen is displayed in the first display region R1 of the main screen 41.

The description of the remote control process is now resumed. The CPU 11 determines after Step 1 whether an operation via a mouse or the like (a mouse operation) is performed (Step S2).

If the CPU 11 determines that a mouse operation is not performed at Step S2 (Step S2; NO), the CPU 11 repeats Step S2 until an mouse operation is performed.

On contrary, if the CPU 11 determines that a mouse operation is performed at Step S2 (Step S2; YES), the CPU 11 determines whether the operation is performed on the main screen 41 (Step S3).

If the CPU 11 determines that the mouse operation is performed on the main screen 41 at Step S3 (Step S3; YES), the CPU 11 executes the first control process (Step S4) and proceeds to Step S5. The first control process is described in detail later.

On contrary, if the CPU 11 determines that the mouse operation is not performed on the main screen 41 at Step S3 (Step S3; NO), the CPU 11 skips Step S4 and proceeds to Step S5.

Next, the CPU 11 determines whether the operation via mouse or the like (mouse operation) involves clicking on the sub screen 42 (Step S5).

If the CPU 11 determines that the mouse operation is a click on the sub screen 42 at Step S5 (Step S5; YES), the CPU 11 executes the second control process (Step S6) and proceeds to Step S7. The second control process is described in detail later.

On contrary, if the CPU 11 determines that the mouse operation is not a click on the sub screen 42 at Step S5 (Step S5; NO), the control 11 skips Step S6 and proceeds to Step S7.

Next, the CPU 11 determines whether the mouse operation is performed on the folder screen 43 (Step S7).

If the CPU 11 determines that the mouse operation is performed on the folder screen 43 at Step S7 (Step S7; YES), the CPU 11 executes the third control process (Step S8) and proceeds to Step S9. The third control process is described in detail later.

On contrary, if the CPU 11 determines that the mouse operation is not performed on the folder screen 43 at Step S7 (Step S7; NO), the CPU 11 skips Step S8 and proceeds to Step S9.

Next, the CPU 11 determines whether the mouse operation involves switching to the batch mode, that is, selection of the batch mode using the radio button 441 on the mode selection screen 44 (Step S9).

If the CPU 11 determines that the mouse operation involves switching to the batch mode at Step S9 (Step S9; YES), the CPU 11 executes transition to the batch mode (Step S10) and proceeds to Step S11.

On contrary, if the CPU 11 determines that the mouse operation does not involve switching to the batch mode at Step S9 (Step S9; NO), the CPU 11 skips Step S10 and proceeds to Step S11.

Next, the CPU 11 determines whether the mouse operation involves switching to the single mode, that is, selection of the single mode using the radio button 441 on the mode selection screen 44 (Step S11).

If the CPU 11 determines that the mouse operation involves switching to the single mode at Step S11 (Step S11; YES), the CPU 11 executes transition to the single mode (Step S12) and proceeds to Step S13.

On contrary, if the CPU 11 determines that the mouse operation does not involve switching to the single mode at Step S11 (Step S11; YES), the CPU 11 skips Step S12 and proceeds to Step S13.

Next, the CPU 11 determines whether the mouse operation is for ending the remote control process (for example, closing the remote display screen 40) (Step S13).

If the CPU 11 determines that the mouse operation is for ending the remote control process at Step S13 (Step S13; YES), the CPU 11 ends the remote control process.

On contrary, if the CPU 11 determines that the mouse operation is for ending the remote control process at Step S13 (Step S13; NO), the PCU 11 returns to Step S2 and repeats the subsequent steps.

<First Control Process>

Figure 7:
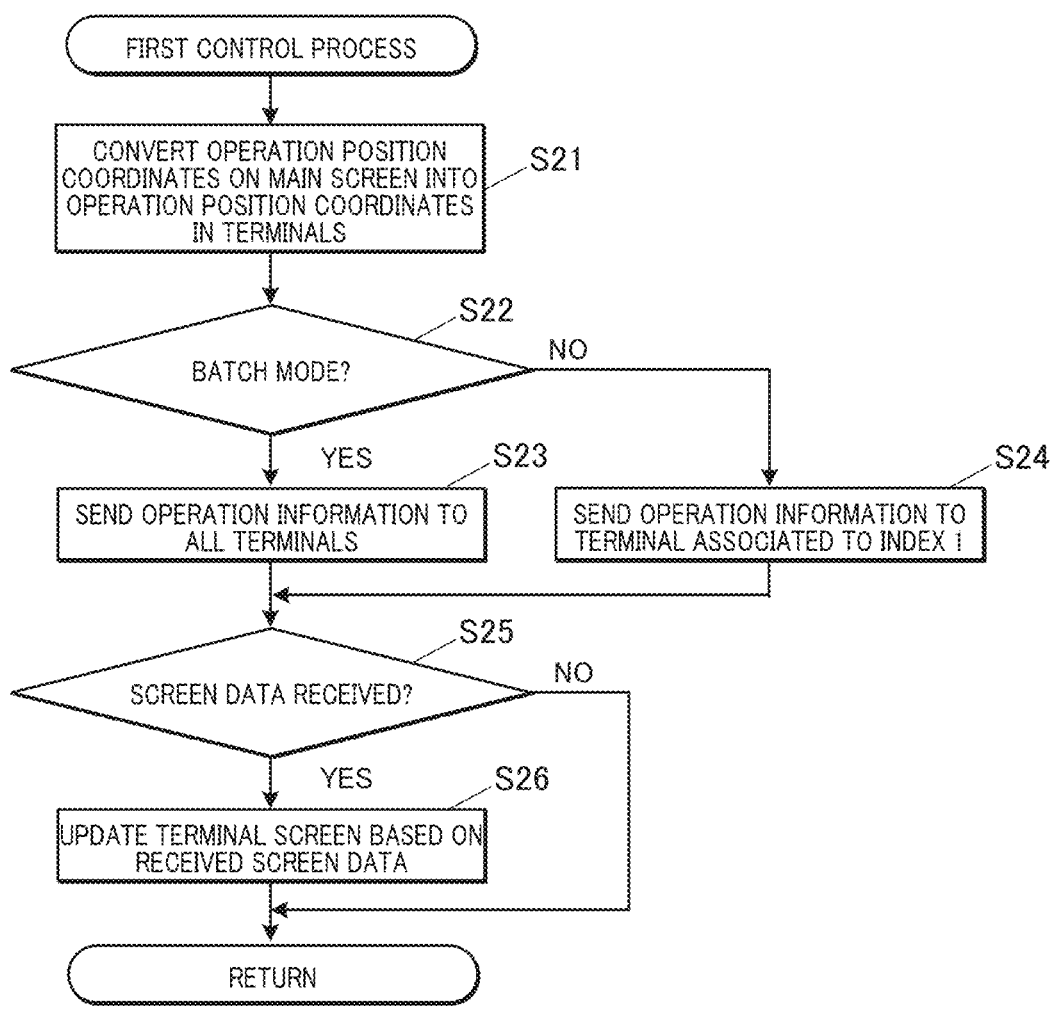
FIG. 7 is a flowchart showing control steps of a first control process.

Next, the first control process is described with reference to FIG. 7. FIG. 7 is a flowchart showing control steps of the first control process.

As shown in FIG. 7, at the start of the first control process, the CPU 11 first converts operation position coordinates pointed by the pointer when the mouse operation is performed into operation position coordinates on the display 24 of the actual handheld terminal(s) 2 (Step S21). Here, the operation position coordinates are measured using the upper left corner of the screen in the first display region R1 of the main screen 41 as a reference. The management apparatus has size data of the displays 24 of the handheld terminals 2.

Next, the CPU 11 determines whether the batch mode is currently running based on the input on the radio buttons 441 (Step S22).

If the CPU 11 determines that the batch mode is currently running at Step S22 (Step S22; YES), the CPU 11 sends the operation information to all of the seven handheld terminals 2 when the mouse operation is performed. The operation information includes data on the operation position coordinates converted at Step S21 and operation property data concerning the mouse operation (for example, data indicating one-click, double-click, etc.).

For example, as shown in FIG. 6, if the mouse operation is a double-click on a setting icon I, the second one on the right column on the home screen displayed in the first display region R1 on the main screen 41, the CPU 11 sends the data on the operation position coordinates on the display 24 of the actual handheld terminal 2 converted from the operation position coordinates when the setting icon I is double-clicked and the operation property data indicating that the operation is a double-click as a property. The handheld terminals 2 are operated based on the operation information received from the management apparatus 1, and if the screen transitions as a result of the operation, the screen data after transition is sent to the management apparatus 1.

If the CPU 11 determines that the batch mode is not currently running, that is, the single mode is running at Step S22 (Step S22; NO), the CPU 11 sends the operation information concerning the mouse operation to the handheld terminal 2 with the IP address "129.1.68.1.61" associated with Index 1 in the terminal identification table 131.

Next, the CPU 11 determines whether screen information is received from the handheld terminal 2 to which the operation information is sent (Step S25).

If the CPU 11 determines that screen data is received from the handheld terminal 2 to which the operation information is sent at Step S25 (Step S25; YES), the CPU 11 updates the screen in the corresponding region based on the received screen data (Step S26) and moves to Step S5 of the remote control process.

On contrary, if the CPU 11 determines that screen data is not received from the handheld terminal 2 to which the operation information is sent at Step S25 (Step S25; NO), the CPU 11 skips Step S26 and returns to Step S5 of the remote control process.

Figure 8:
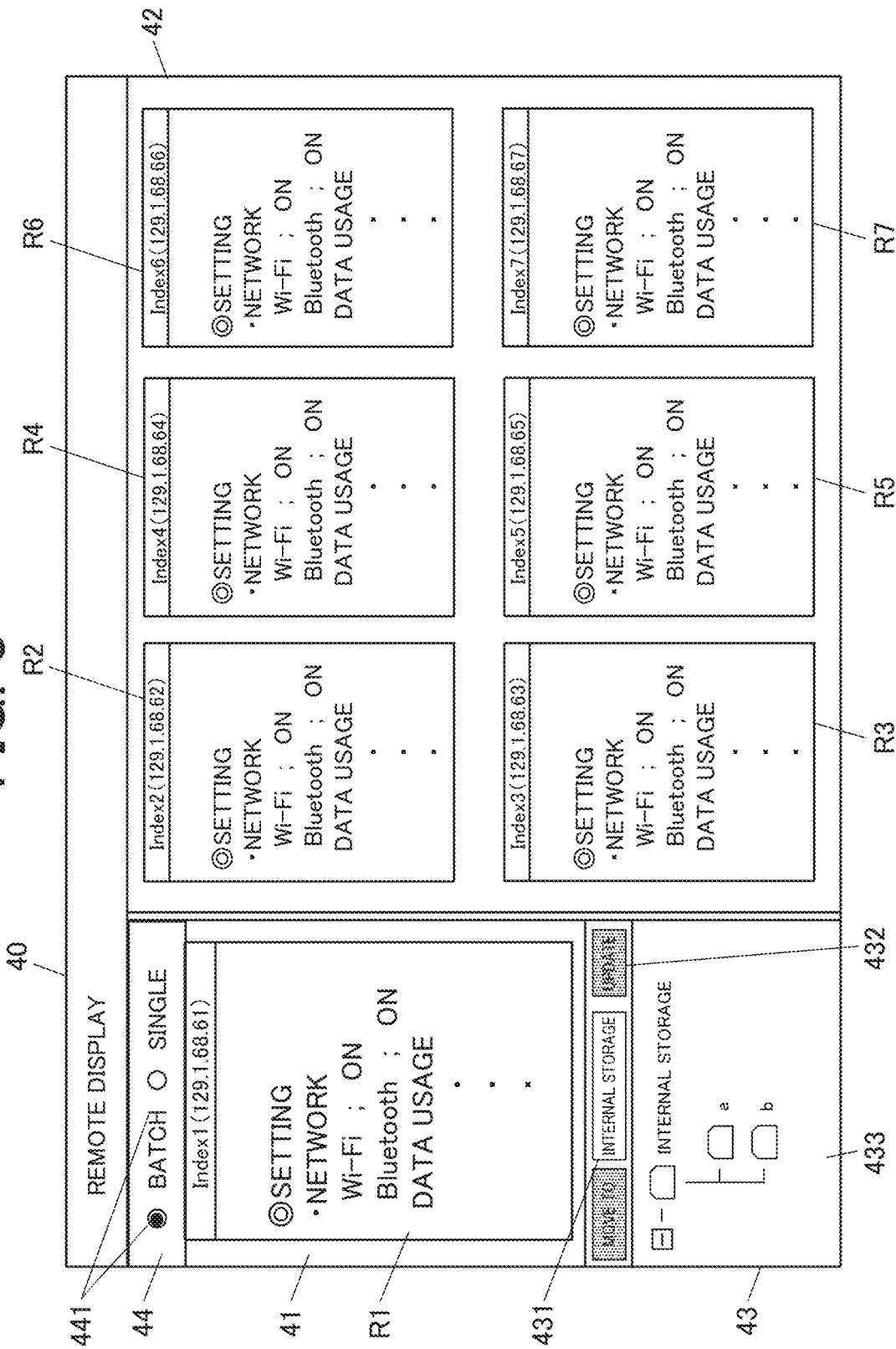
FIG. 8 shows an example of the remote display screen.

In the remote display screen 40 shown in FIG. 8, the home screen displayed in the first to seventh display regions R1 to R7 are updated to the setting screen in response to the operation of a double-click on the setting icon I on the home screen displayed in the first display region R1 of the main screen 41 as described above. As described above, the management apparatus 1 can start the setting applications collectively in the handheld terminals 2 by a double-click of the setting icon on the home screen displayed in the first display region R1 of the main screen 41, and the setting screens displayed on the displays 24 of the handheld terminals 2 can be displayed in the first to seventh display regions R1 to R7, as shown in FIG. 8.

Figure 9:
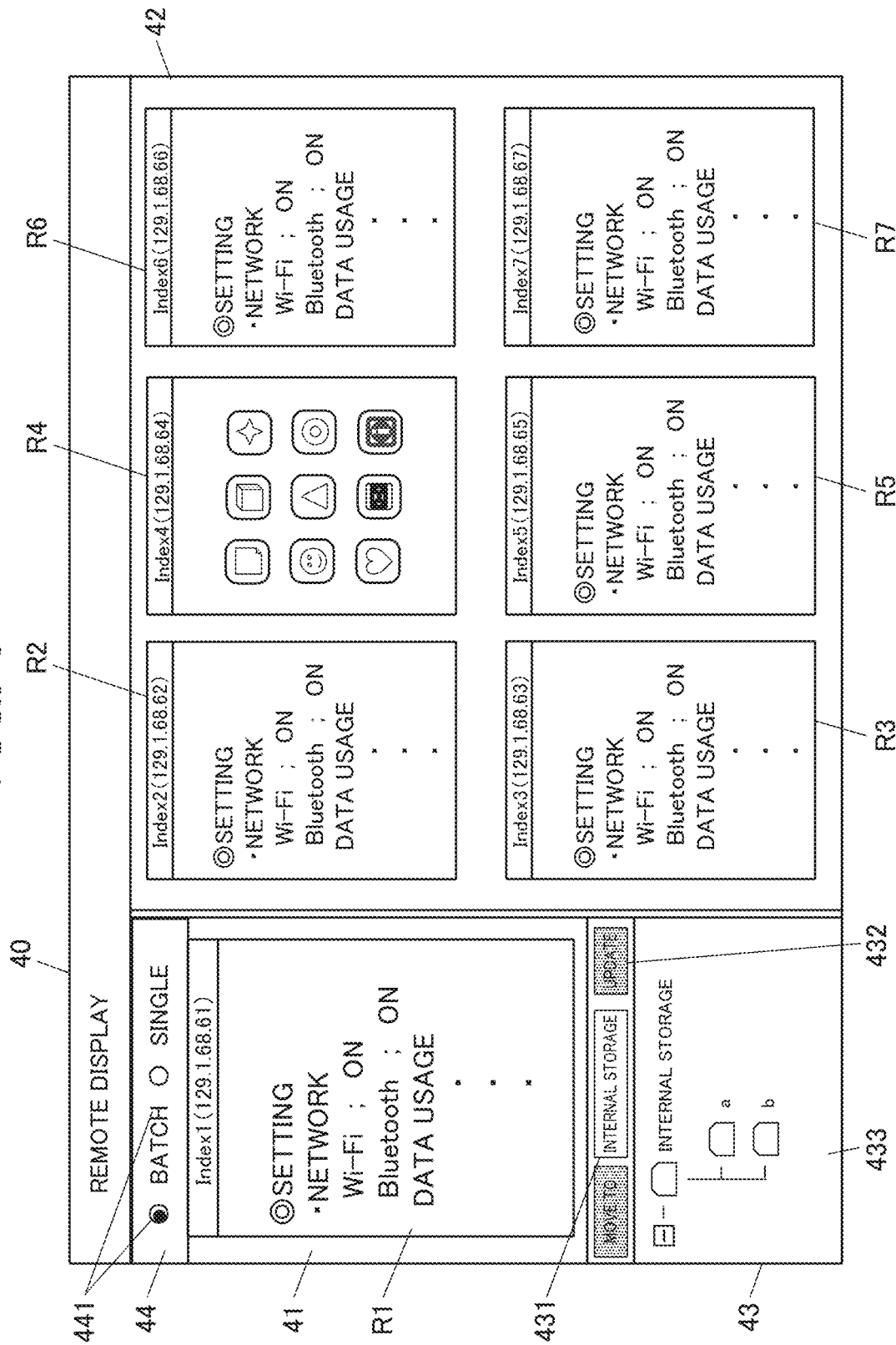
FIG. 9 shows an example of the remote display screen.

On contrary, in the remote display screen 40 shown in FIG. 9, although the setting icon is double-clicked on the home screen displayed in the first display region R1 of the main screen 41, the home screen displayed in the fourth display region R4 is not switched to the setting screen and left unchanged due to a hang-up or communication error in the handheld terminal 2 with the IP address "129.1.68.64" associated with Index 4. In that way, in the management apparatus 1, it is possible to check visually the handheld terminal(s) 2 which does not work correctly, for example, whose screens are not switched as described above in the collective remote control of the handheld terminals 2.

<Second Control Process>

Figure 10:
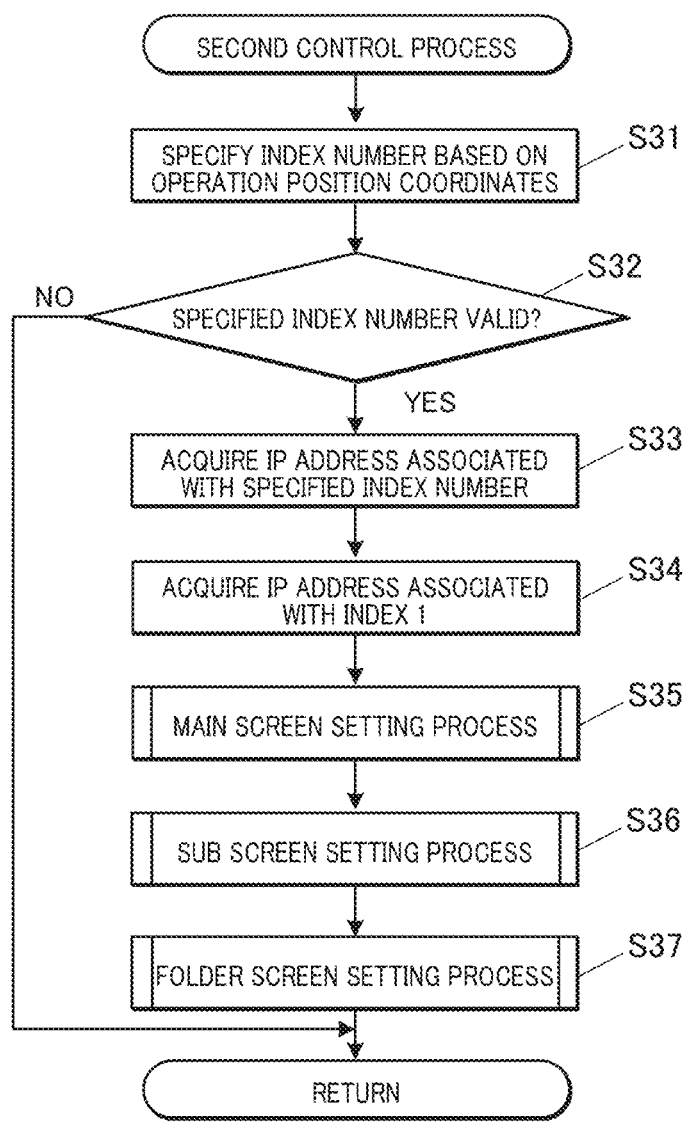
FIG. 10 is a flowchart showing control steps of a second control process.

Next, the second control process is described with reference to FIG. 10. FIG. 10 is a flowchart showing control steps of the second control process.

As shown in FIG. 10, at the start of the second control process, the CPU 11 specifies the index number of the display region including the operation position coordinates pointed by the pointer with a click on the sub screen 42 (Step S31). For example, in the case where a click using a mouse or the like is performed while the pointer (not shown in the drawings) is in the fourth display region R4 of the sub screen 42 on the remote display screen 40 shown in FIG. 6, the CPU 11 specifies Index 4 corresponding to the fourth display region R4.

Next, the CPU 11 refers to the terminal identification table 131 and determines whether the index number specified at Step S31 is valid (Step S32). Specifically, the CPU 11 determines that the index number is valid if the IP address of the handheld terminal 2 associated with the index number specified at Step S31 is stored in the terminal identification table 131, and determines that the index number is invalid if the IP address of the handheld terminal 2 associated with the specified index number is not stored in the terminal identification table 131.

If the CPU 11 determines that the index number specified at Step S31 is invalid at Step S32 (Step S32; NO), the CPU 11 moves to Step S7 of the remote control process.

On contrary, if the CPU 11 determines that the index number specified at Step S31 is valid at Step S32 (Step S32; YES), the CPU 11 refers to the terminal identification table 131 and acquires the IP address (for example, "129.1.68.64") associated with the index number (for example, Index 4) specified at Step S31 (Step S33). The CPU 11 then acquires the IP address associated with Index 1 (for example, "129.1.68.61") (Step S34).

Next, the CPU 11 executes the main screen setting process (Step S35), the sub screen setting process (Step S36), and the folder screen setting process (Step S37), and moves to Step S7 of the remote control process. The main screen setting process, the sub screen setting process, and the folder screen setting process are described later in detail.

<Main Screen Setting Process>

Figure 11:
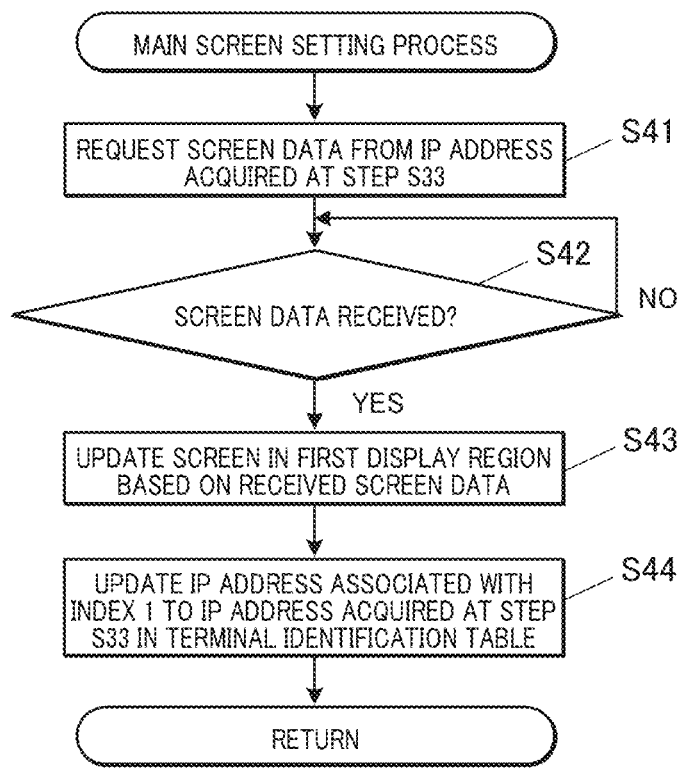
FIG. 11 is a flowchart showing control steps of a main screen setting process.

Next, the main screen setting process is described with reference to FIG. 11. FIG. 11 is a flowchart showing control steps of the main screen setting process.

As shown in FIG. 11, at the start of the main screen setting process, the CPU 11 requests the screen data from the handheld terminal 2 with the IP address acquired at Step S33 of the second control process (for example, "129.1.68.64") (Step S41).

Next, the CPU 11 determines whether the screen data is received from the concerning handheld terminal (Step S42).

If the CPU 11 determines that the screen data is not received from the concerning handheld terminal 2 at Step S42 (Step S42; NO), the CPU 11 repeats Step S42 until the screen data is received.

Figure 14:
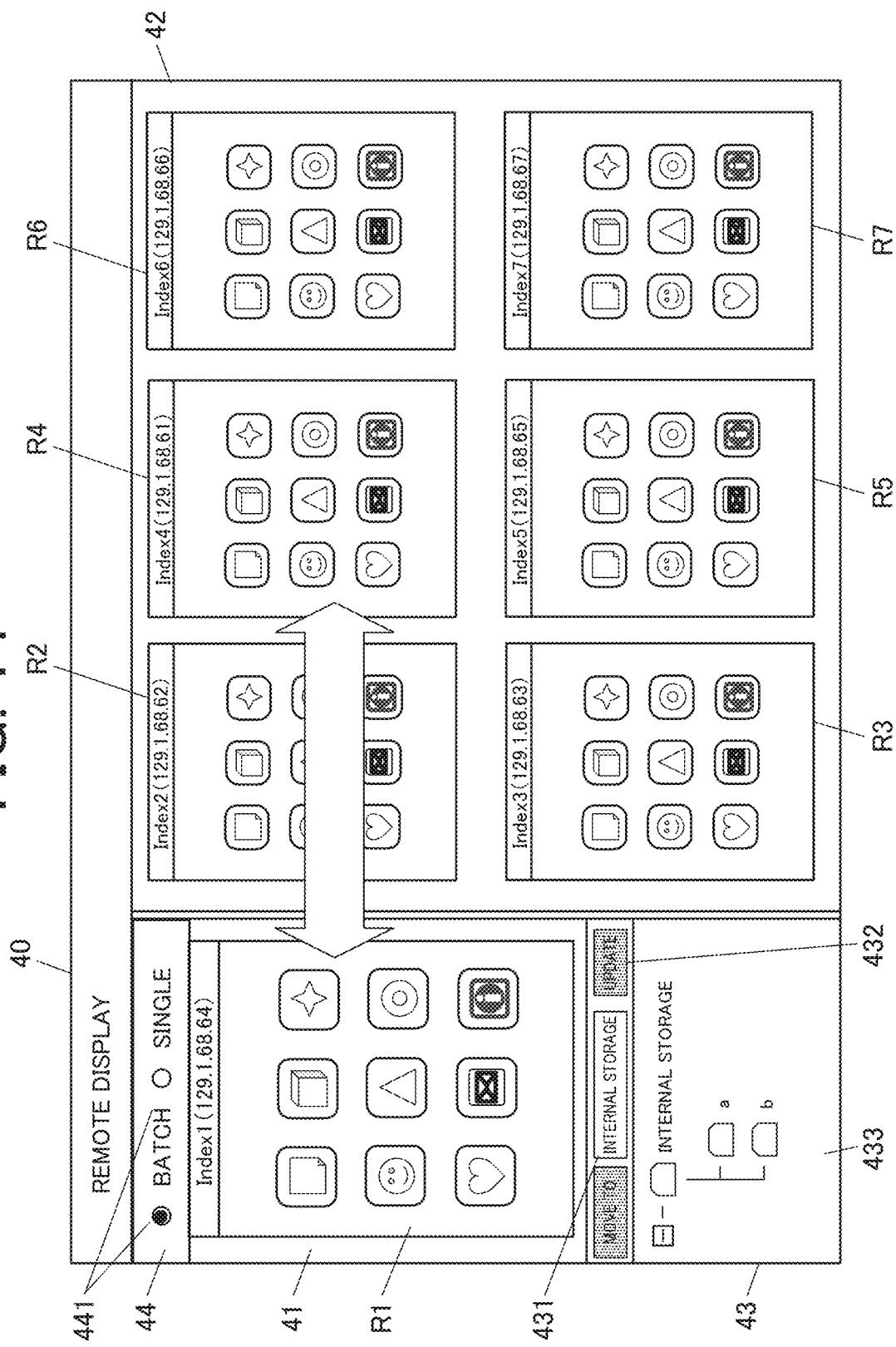
FIG. 14 shows an example of the remote display screen.

On contrary, if the CPU 11 determines that the screen data is received from the concerning handheld terminal 2 at Step S42 (Step S42; YES), the CPU 11 updates the first display region R1 of the main screen according to the screen data (Step S43). That is, in the case where a click using a mouse or the like is performed while the pointer (not shown in the drawings) is in the fourth display region R4 of the sub screen 42 as in the above-described example, the home screen of the handheld terminal 2 with the IP address "129.1.68.64" which was displayed in the fourth display region R4 of the sub screen 42 until then is displayed in the first display region R1 of the main screen 41, as shown in FIG. 14.

Next, the CPU 11 updates the IP address acquired at Step S33 of the second control process (for example, "129.1.68.61") associated with Index 1 in the terminal identification table 131 to the IP address acquired at Step S33 of the second control process (for example, "129.1.68.64"), and transitions to Step S36 of the second control process.

<Sub Screen Setting Process>

Next, the sub screen setting process is described with reference to FIG. 12. FIG. 12 is a flowchart showing control steps of the sub screen setting process.

As shown in FIG. 12, at the start of the sub screen setting process, the CPU 11 first requests screen data from the handheld terminal 2 with the IP address (for example, "129.1.68.61") acquired at Step S34 of the second control process (Step S51).

Next, the CPU 11 determines whether the screen data is received from the concerning handheld terminal (Step S52).

If the CPU 11 determines that the screen data is not received from the concerning handheld terminal 2 at Step S52 (Step S52; NO), the CPU 11 repeats Step S52 until the screen data is received.

On contrary, if the CPU 11 determines that the screen data is received from the concerning handheld terminal 2 at Step S52 (Step S52; YES), the CPU 11 updates the display region associated with the index number (for example, Index 4) specified at Step S31 of the second control process on the sub screen 42 based on the received screen data (Step S53). That is, in the case where a click using a mouse or the like is performed while the pointer (not shown in the drawings) is in the fourth display region R4 of the sub screen 42 as in the above-described example, the home screen of the handheld terminal 2 with the IP address "129.1.68.61" which was displayed in the first display region R1 of the main screen 41 until then is displayed in the fourth display region R4 of the sub screen 42, as shown in FIG. 14.

Next, the CPU 11 updates the IP address (for example, "129.1.68.64") associated with the index number specified at Step S31 (for example, Index 4) of the second control process to the IP address acquired at Step S34 (for example, "129.1.68.61") in the terminal identification table 131 (Step S54), and moves to Step S37 of the second control process.

<Folder Screen Setting Process>

Next, the folder screen setting process is described with reference to FIG. 13. FIG. 13 is a flowchart showing control steps of the folder screen setting process.

As shown in FIG. 13, at the start of the folder screen setting process, the CPU 11 first requests data on a folder list on the first level from the handheld terminal 2 (for example, "129.1.68.64") with the IP address acquired at Step S33 of the second control process (Step S61).

Next, the CPU 11 determines whether the first-level folder list data from the concerning handheld terminal 2 (Step S62).

If the CPU 11 determines that the first-level folder list data is not received from the handheld terminal 2 at Step S62 (Step S62; NO), the CPU 11 repeats Step S62 until the folder list data is received.

On contrary, if the CPU 11 determines that the first-level folder list data is received from the handheld terminal 2 at Step S62 (Step S62; YES), the CPU 11 displays the folder list on the first level (for example, a folder a and a folder b) on the folder screen 43 as shown in FIG. 14 based on the folder list data (Step S63), and then moves to Step S7 of the remote control process.

<Third Control Process>

Figure 15:
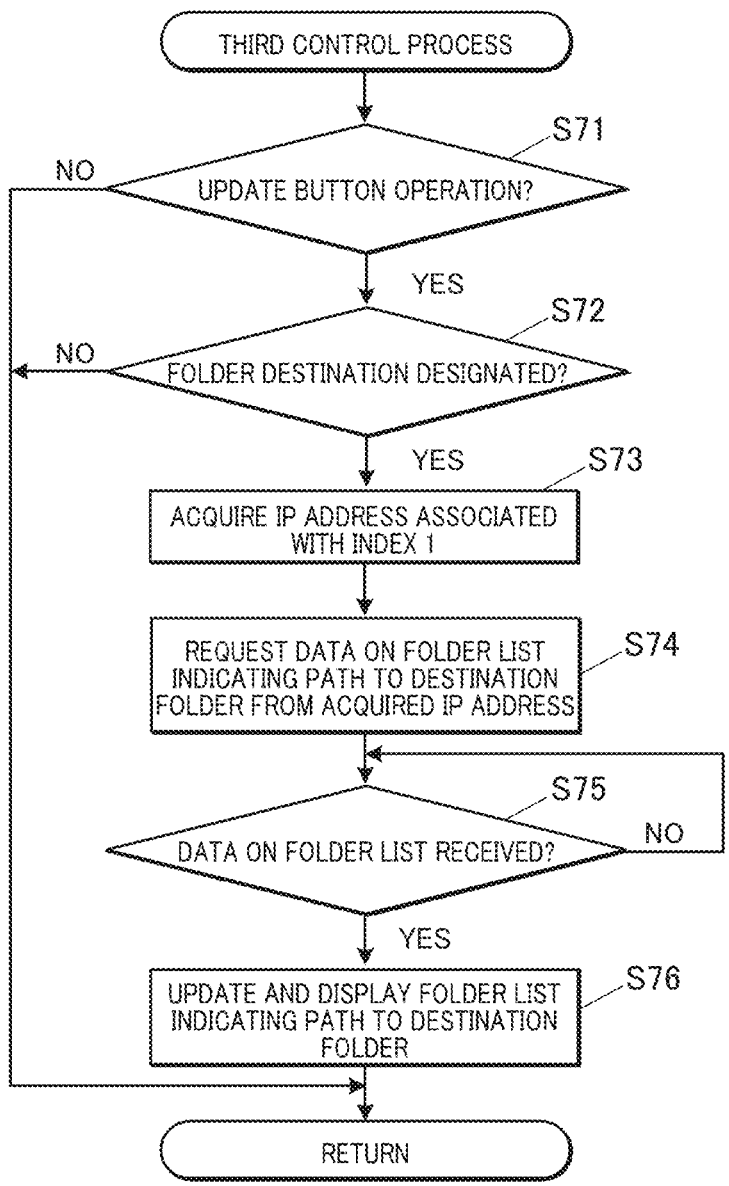
FIG. 15 is a flowchart showing control steps of a third control process.

Next, the third control process is described with reference to FIG. 15. FIG. 15 is a flowchart showing control steps of the third control process.

As shown in FIG. 15, at the start of the third control process, the CPU 11 first determines whether the update button 432 is pressed (Step S71).

If the CPU 11 determines that the update button 432 is not pressed at Step S71 (Step S71; NO), the CPU 11 moves to Step S9 of the remote control process.

On contrary, if the CPU 11 determines that the update button 432 is pressed at Step S71 (Step S71; YES), the CPU 11 determines whether a folder destination is designated in the input region 431 by an input operation (Step S72).

If the CPU 11 determines that the destination folder is not designated at Step S72 (Step S72; NO), the CPU 11 returns to Step S9 of the remote control process.

On contrary, if the CPU determines that the destination folder is designated in Step S72 (Step S72; YES), the CPU 11 refers to the terminal identification table 131 and acquires the IP address associated with Index 1 (Step S73).

Next, the CPU 11 requests the folder list data indicating the path to the destination folder input in the input region 431 from the handheld terminal 2 with the IP address acquired at Step S73 (Step S74).

Next, the CPU 11 determines whether the folder list data indicating the path to the destination folder is received from the concerning handheld terminal 2 (Step S75).

If the CPU 11 determines that the folder list data indicating the path to the destination folder is not received from the concerning handheld terminal 2 at Step S75 (Step S75; NO), the CPU 11 repeats Step S75 until the folder list data is received.

Figure 16:
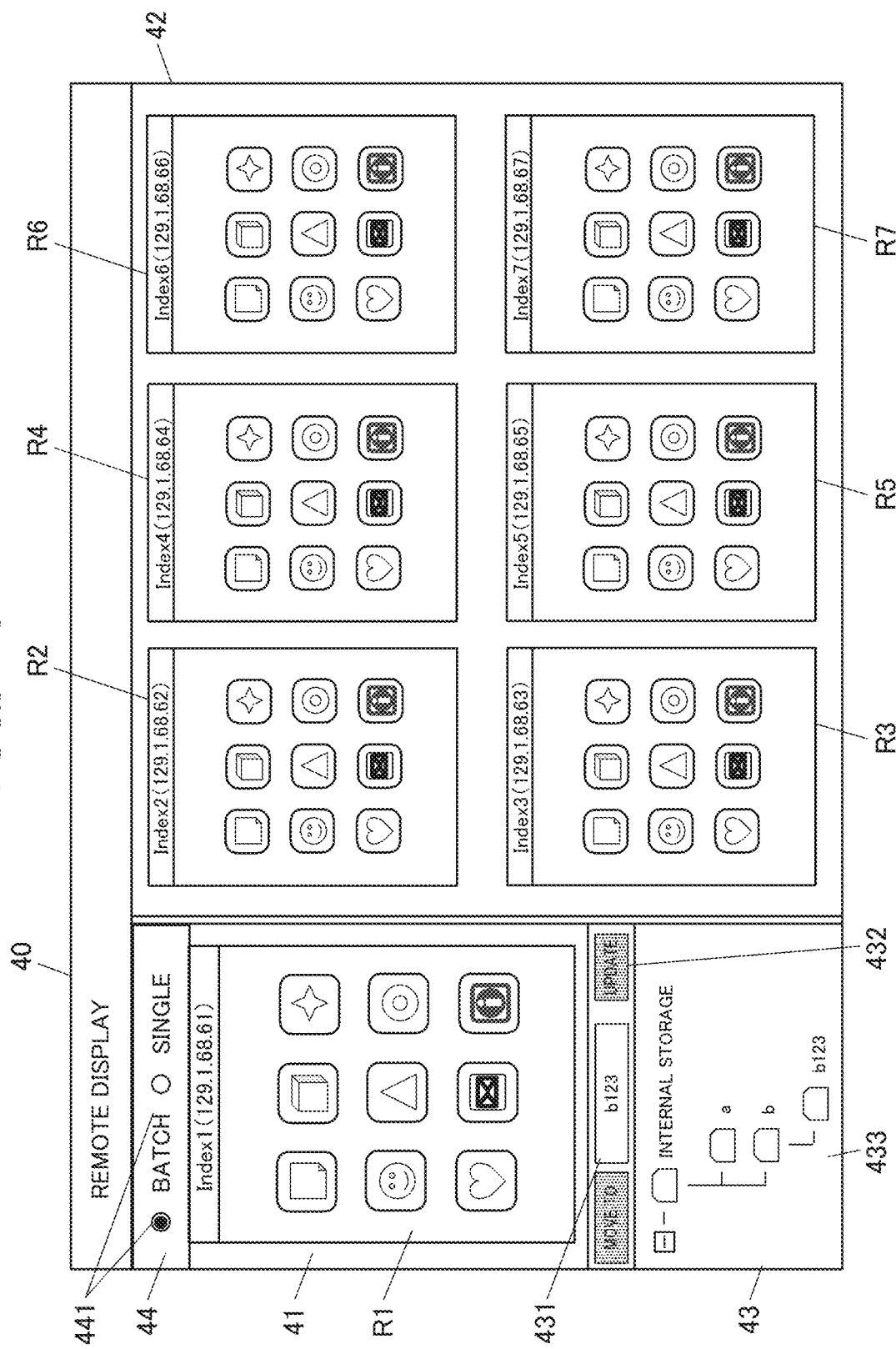
FIG. 16 shows an example of the remote display screen.

On contrary, the CPU 11 determines that the folder list data indicating the path to the destination folder is received from the handheld terminal 2 at Step S75 (Step S75; YES), the CPU 11 updates the folder list to indicate the path to the destination folder (for example, a folder b123) on the folder screen 43 (Step S76), as shown in FIG. 16, and moves to Step S9 of the remote control process.

<File Copying Process>

Figure 17:
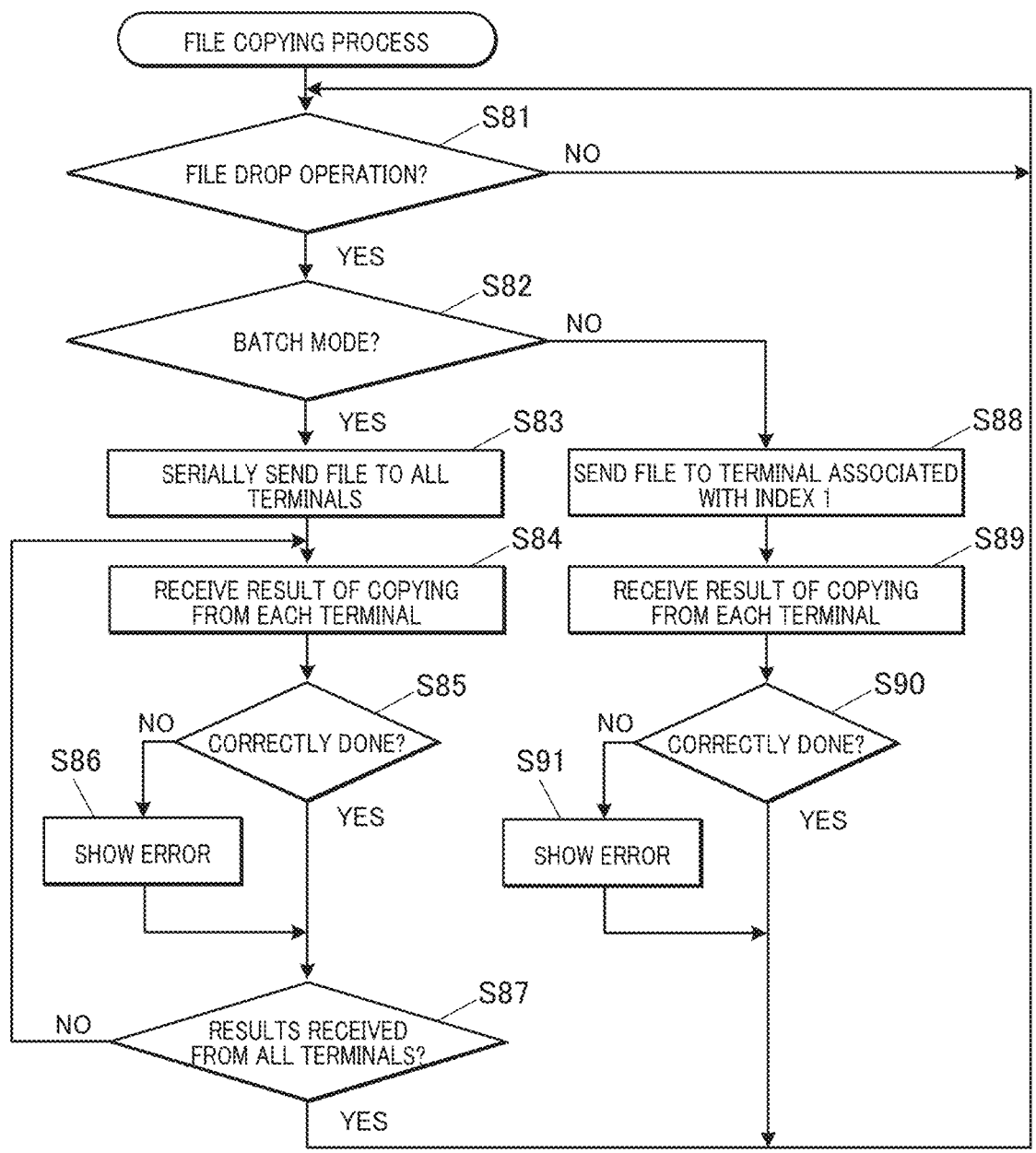
FIG. 17 is a flowchart showing control steps of a file copying process.

Next, the file copying process is described with reference to FIG. 17. FIG. 17 is a flowchart showing control steps of the file copying process.

Figure 18:
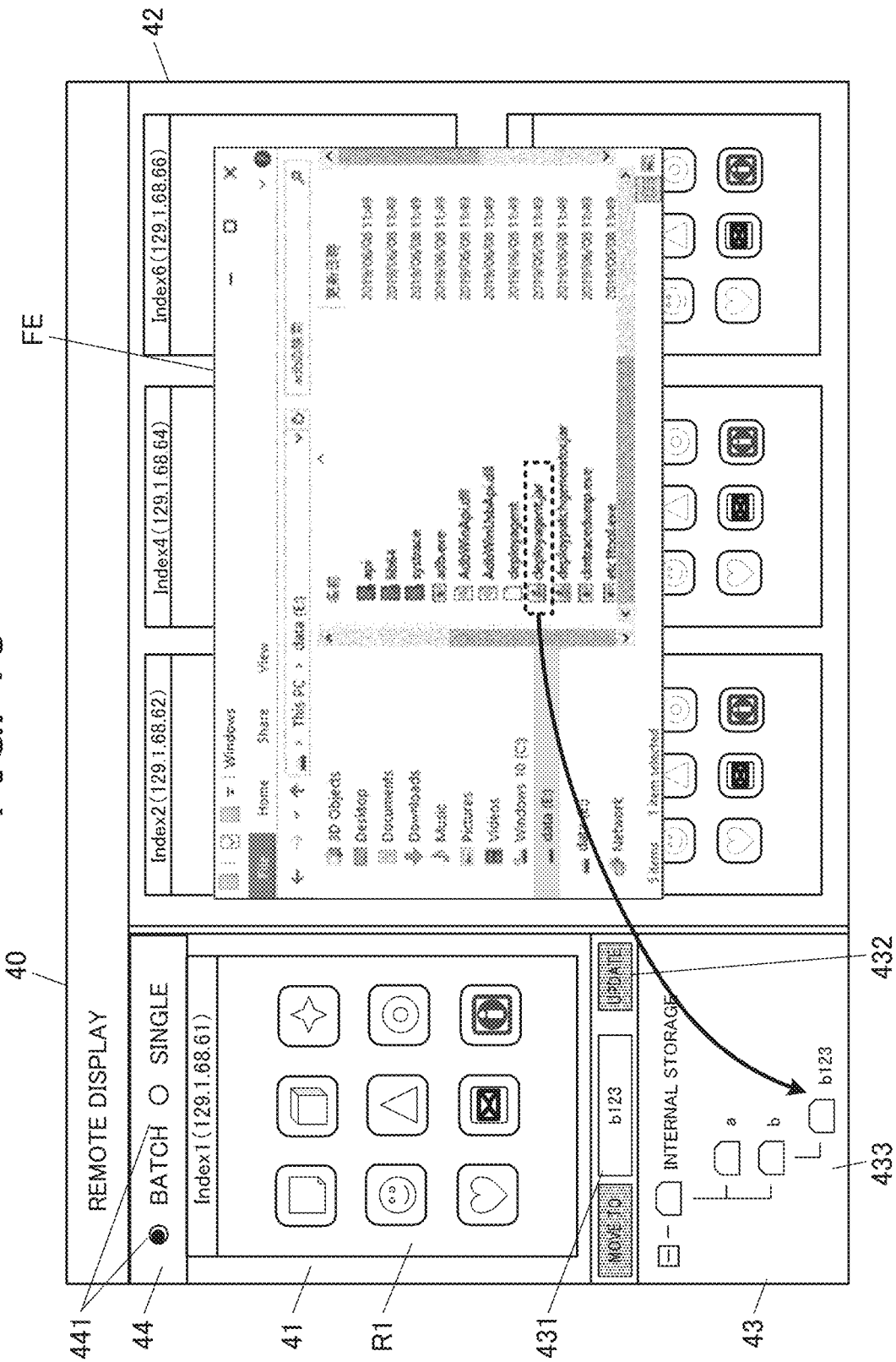
FIG. 18 shows a file drop operation.

At the start of the file copying process, for example, the CPU 11 first drags a target file of copying (enclosed by a dotted line in FIG. 17) from a file explorer FE overlapped on the remote display screen 40 as shown in FIG. 18 and drop it on a preferred folder displayed on the folder screen 43 (for example, a folder b123) (Step S81).

If the CPU 11 determines whether a file is not dragged and dropped at Step S81 (Step S81; NO), the CPU 11 repeats Step S81 until a file is dragged and dropped.

On contrary, if the CPU 11 determines that a file is dragged and dropped at Step S81 (Step S81; YES), the CPU 11 determines whether the batch mode is currently running based on the input status at the radio button 441 (Step S82).

If the CPU 11 determines that the batch mode is currently running at Step S82 (Step S82; YES), the CPU 11 serially sends the dropped file to all of the seven handheld terminals 2 (Step S83). The file sent to each of the handheld terminals 2 is copied to the folder onto which the file is dropped.

Next, the CPU 11 receives a result of file copying from each of the handheld terminals 2 (Step S84).

Next, the CPU 11 determines whether the result received from the handheld terminal 2 indicates that the file copying is successfully completed (Step S85).

If the CPU 11 determines that the result received from the handheld terminal 2 indicates that the file copying is successfully completed at Step S85 (Step S85; YES), the CPU 11 skips Step S86 and proceeds to Step S87.

On contrary, if the CPU 11 determines that the result received from the handheld terminal 2 includes an error at Step S85 (Step S85; NO), the CPU 11 displays an error message reporting that an error has occurred in the file copying in the region in which the screen of the handheld terminal 2 involving the error is displayed (Step S86), and proceeds to Step S87.

Next, the CPU 11 determines whether results of the file copying are received from all of the seven handheld terminals 2 (Step S87).

If the CPU 11 determines that the results of the file copying are not received from all of the seven handheld terminals 2 at Step S87 (Step S87; NO), the CPU 11 returns to Step S84 and repeats the subsequent steps.

On contrary, if the CPU 11 determines that the results of the file copying are received from all of the handheld terminals 2 at Step S87 (Step S87), the CPU 11 returns to Step S81 and repeats the subsequent steps.

If the CPU 11 determines that the batch mode is not currently running but the single mode is at Step S82 (Step S82; NO), the CPU 11 sends the dropped file to the handheld terminal 2 associated with Index 1 (Step S88).

Next, the CPU 11 receives the result of the file copying from the handheld terminal 2 associated with Index 1 (Step S89).

Next, the CPU 11 determines whether the result received from the handheld terminal 2 associated with Index 1 indicates that the file copying is successfully completed (Step S90).

If the CPU 11 determines that the result of the file copying received from the handheld terminal 2 associated with Index 1 indicates that the file copying is successfully completed at Step S90 (Step S90; YES), the CPU 11 returns to Step S81 and repeats the subsequent steps.

On contrary, if the CPU 11 determines that the result of the file copying received from the handheld terminal 2 associated with Index 1 includes an error at Step S90 (Step S90; NO), the CPU 11 displays an error message reporting that an error has occurred in the file copying in the first display region in which the screen of the concerning handheld terminal 2 is displayed (Step S91), moves to Step S81, and repeats the subsequent steps.

<Request Response Process>

Figure 19:
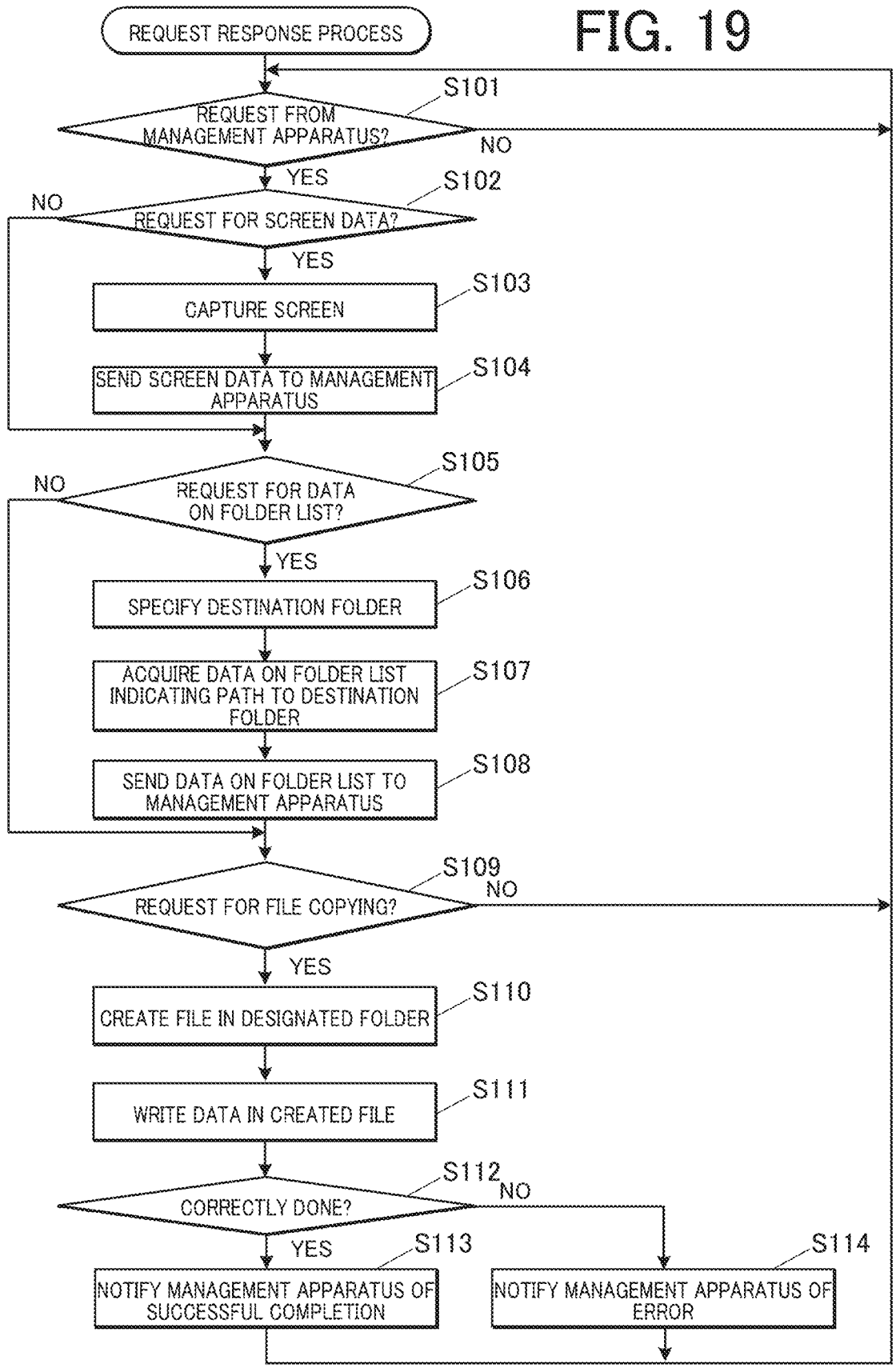
FIG. 19 is a flowchart showing control steps of a request response process.

Next, the request response process executed in each of the handheld terminals 2 is described with reference to FIG. 19. FIG. 19 is a flowchart showing control steps of the request response process.

As shown in FIG. 19, at the start of the request response process, the CPU 21 first determines whether a request is made by the management apparatus 1 (Step S101).

If the CPU 21 determines that a request is not made by the management apparatus 1 at Step S101 (Step S101; NO), the CPU 21 repeats Step S101 until a request is made by the management apparatus 1.

On contrary, if the CPU 21 determines that a request is made by the management apparatus 1 at Step S101 (Step S101; YES), the CPU 21 determines whether screen data is requested in the request (Step S102).

If the CPU 21 determines that screen data is requested by the management apparatus 1 at Step S102 (Step S102; YES), the CPU 21 captures the screen displayed on the display 24 of the handheld terminal 2 itself (Step S103), and sends the screen data to the management apparatus 1 (Step S104). The CPU 21 proceeds to Step S105.

On contrary, if the CPU 21 determines that screen data is not requested by the management apparatus 1 at Step S102 (Step S102; NO), the CPU 21 skips Steps S103 and S104 and proceeds to Step S105.

Next, the CPU 21 determines whether folder list data is requested by the management apparatus 1 (Step S105).

If the CPU 21 determines that the folder list data is requested by the management apparatus 1 at Step S105 (Step S105; YES), the CPU 21 specifies the destination folder (Step S106), acquires the folder list data indicating the path to the destination folder (Step S107), and sends the folder list data to the management apparatus 1 (Step S108). The CPU 21 then proceeds to Step S109.

On contrary, if the CPU 21 determines that it is not the folder list data that is requested by the management apparatus 1 at Step S105 (Step S105; NO), the CPU 21 skips Steps S106 to S108 and proceeds to Step S109.

Next, the CPU 21 determines whether file copying is requested by the management apparatus 1 (Step s109).

If the CPU 21 determines that file copying is requested by the management apparatus 1 at Step S109 (Step S109; YES), the CPU 21 creates a target file of copying in a folder designated in the request for file copying (Step S110), and writes (copies) data in the file (Step S111).

Next, the CPU 21 determines whether the file copying is successfully completed (Step S112).

If the CPU 21 determines that the file copying is successfully completed at Step S112 (Step S112; YES), the CPU 21 notifies the management apparatus 1 of the successful completion of the file copying (Step S113), then returns to Step S101 and repeats the subsequent steps.

On contrary, if the CPU 21 determines that the file copying is not successfully done at Step S112 (Step S112; NO), the CPU 21 notifies the management apparatus 1 of the result that the file copying is not successfully done (Step S114), then returns to Step S101 and repeats the subsequent steps.

If the CPU 21 determines that it is not file copying that is requested by the management apparatus 1 at Step S109 (Step S109; NO), the CPU 21 returns to Step S101 and repeats the subsequent steps.

As described hereinbefore, the management apparatus 1 in this embodiment displays an operation screen displayed on the display 24 of representative one of the handheld terminals 2 in the first display region R1 of the main screen 41 on the remote display screen 40 as the operation screen for collective remote operation of the handheld terminals 2, and displays in response to a user operation on the operation screen, a result of an input of the user operation to the representative handheld terminal 2 displayed on the display 24 of the representative handheld terminal 2 in the first display region R1 and results of an input of the user operation to the handheld terminals 2 displayed on the displays 24 of the handheld terminals 2 other than the handheld terminal 2 in the second to seventh display regions R2 to R7 of the sub screen 42.

Accordingly, in the management apparatus 1, all of the seven handheld terminals 2 can be remotely controlled collectively by a remote operation via the operation screen of one of the handheld terminals 2 displayed in the first display region R1 of the main screen 41. Thus, the remote operation of the multiple handheld terminals 2 is easily done.

In the case where the number of the handheld terminals 2 other than the representative handheld terminal 2 is more than one, the management apparatus displays in response to a user operation on the operation screen, a result of an input of the user operation to the representative handheld terminal 2 displayed on the display 24 of the representative handheld terminal 2 in the first display region R1 and results of an input of the user operation to the handheld terminals 2 displayed on the displays 24 of the handheld terminals 2 other than the handheld terminal 2 in the second to seventh display regions R2 to R7 of the sub screen 42.

Accordingly, in the management apparatus 1, results of an input of the user operation to the handheld terminals 2 displayed on the displays 24 of the handheld terminals 2 other than the handheld terminal 2 are displayed in the second to seventh display regions R2 to R7 of the sub screen 42. Thus, it is easier to detect the handheld terminal(s) 2 which does not work correctly in the remote operation.

While the operation screen is displayed in the first display region R1, the management apparatus 1 displays the copy of the operation screen displayed on the display of the handheld terminals 2 other than the representative handheld terminal 2 in the second display region R2 of the sub screen 42 such that the handheld terminals 2 other than the representative handheld terminal 2 are identifiable.

Accordingly, in the management apparatus 1, when all of the seven handheld terminals 2 are remotely controlled collectively, it is possible to easily detect one that works unexpectedly.

The management apparatus 1 displays the folder screen 43 through which an input of a user operation for copying a file is received as the remote operation in the remote display 40, while the user operation for copying the file is designation of a destination of the file to be copied.

Accordingly, in the management apparatus 1, the remote operation of the multiple handheld terminals 2 for file copying is more easily done.

The management apparatus 1 receives an input of selecting either one of the single mode and the batch mode via the radio buttons 441. In the single mode, the operation screen of one of the handheld terminals 2 displayed in the first display region R1 of the main screen 41 is used for the exclusive remote operation of that handheld terminals 2. In the batch mode, the operation screen is used for the collective remote operation of the handheld terminals 2.

Accordingly, in the management apparatus 1, while all of the seven handy terminals 2 are remotely controlled collectively, one of the handheld terminals may also be remotely controlled. Thus, it allows flexibility in the remote operation.

In the management apparatus 1, it is possible to receive an input operation for switching the handheld terminal 2 to be shown in the first display region R1 of the main screen 41. Thus, it allows flexibility in the remote operation of the handheld terminals 2.

In the above, the present invention is described on the basis of an embodiment in detail. However, the present invention is not limited to the above embodiment and can be modified without departing from the scope of the present invention.

For example, in the above embodiment, the seven handheld terminals 2 are remotely controlled collectively by the management apparatus 1. However, the number of the handheld terminals 2 to be remotely controlled collectively may be two or more, and not limited to seven.

In the above embodiment, the handheld terminal 2 is described as an example of the target of the remote operation. However, terminal devices such as smartphones and smart watches may be the target of the remote operation.

In the above embodiment, the seven handheld terminals 2 are remotely controlled collectively in the batch mode. However, for example, an input operation for selecting one or more handheld terminals 2 may be received as the target of the remote operation out of the six handheld terminals 2 excluding the handheld terminal 2 whose operation screen is displayed in the first display region R1 of the main screen 41. This enables collective remote operation of three of the handheld terminals 2 that the user designates, for example.

In the above-described embodiment, as a computer readable medium storing the programs of the present invention, the HDD and/or the SSD of the storage 13 are used. This is not intended to limit the present invention. The computer readable medium may be a flash memory or a portable recording/storage medium, such as a CD-ROM. Further, as a medium to provide data of the programs of the present invention via a communication line, a carrier wave can be used.

In the above, one or more embodiments of the present invention are described. However, the scope of the present invention is not limited thereto. The scope of the present invention includes the scope of claims below and the scope of their equivalents.

What is claimed is:

1. An information processing apparatus for remotely controlling multiple terminal devices, the information processing apparatus comprising:
    a display screen having a first display region and a different second display region;
    at least one processor configured to execute:
    a display control process to:
    receive a first user input operation to designate a first terminal device of the multiple terminal devices as a representative device for collective remote operation of the multiple terminal devices;
    in response to the designating the first device as the representative device:
        display a first display screen of the first device in the first display region,
        display a second display screen in the second display region, the second display screen being displayed on a display of a second terminal device of the multiple terminal devices other than the representative terminal device; and
        receive a second user input operation on the first display screen,
    in response to the designating the first device as the representative device and the second user input operation, the processor:
    transmits first information to the multiple terminal devices via a communication unit;
    displays, in the first display region, a first screen that shows a result of the second user input operation to the representative device; and displays, in the second display region, a second screen that shows a result of the second user input operation to the second terminal device of the multiple terminal devices other than the representative device, and
    receive a third user input operation to designate the second terminal device of the multiple terminal devices as a switched representative device;
    in response to designating the second terminal device as the switched representative device, the processor:
    does not perform a transmission process based on the third user input operation to the multiple terminal devices via the communication unit; and
    displays the first display screen of the representative terminal device in the second display region and displays the second display screen of the second terminal device of the multiple terminal devices on which the third user input operation is received in the first display region as the switched representative device;
    receive a fourth user input operation on the second display screen;

in response to the designating the second terminal device as the switched representative device and the fourth user input operation:
  transmits second information to the multiple terminal devices via the communication unit;
  displays, in the first display region, a third screen that shows a result of the fourth user input operation to the switched representative device; and displays, in the second display region, a fourth screen that shows a result of the fourth user input operation to the first terminal device of the multiple terminal devices other than the representative device.

2. The information processing apparatus according to claim 1,
  wherein the multiple terminal devices include two or more terminal devices in addition to the representative device, and
  wherein the processor:
    collectively displays, in the second display region, copies of multiple screens that are displayed respectively on the two or more terminal devices and that show the result of the second user input operation on the first display screen to the two or more terminal devices.

3. The information processing apparatus according to claim 1,
  wherein in a file copying process, the processor displays, in a third display region, a window screen through which the processor receives a fifth user input operation for copying a file as a remote operation, the fifth user input operation for copying the file being designation of a destination of the file to be copied, the third display region being different from the first display region.

4. The information processing apparatus according to claim 1,
  wherein the first display screen in the first display region is for exclusive remote operation of the representative device as well as collective remote operation of the multiple terminal devices,
  wherein the processor executes a mode reception process to receive an input of selecting either one of a single mode and a batch mode,
  wherein in the single mode, the processor allows the user to perform the exclusive remote operation of the representative terminal device, and
  wherein in the batch mode, the processor allows the user to perform the collective remote operation of the multiple terminal devices.

5. An information processing method for remotely controlling multiple terminal devices with an information processing apparatus having a display screen including a first display region and a different second display region, the information processing method comprising:
  receiving a first user input operation to designate a first terminal device of the multiple terminal devices as a representative device for collective remote operation of the multiple terminal devices;
  in response to the designating the first device as the representative device:
    displaying a first display screen of the first device in the first display region
    displaying a second display screen in the second display region, the second display screen being displayed on a display of a second terminal device of the multiple terminal devices other than the representative device; and
  receiving a second user input operation on the first display screen,
  in response to the designating the first device as the representative device and the second user input operation, the information processing method further comprises:
    transmitting first information to the multiple terminal devices via a communication unit;
    displaying, in the first display region, a first screen that shows a result of the second user input operation to the representative device; and
    displaying, in the second display region, a second screen that shows a result of the second user input operation to the second terminal device of the multiple terminal devices other than the representative device, and
  receiving a third user input operation to designate the second terminal device of the multiple terminal devices as a switched representative device;
  in response to designating the second terminal device as the switched representative device:
    non-transmitting of information so that information is not transmitted based on the third user input operation to the multiple terminal devices via the communication unit; and
    displaying the first display screen of the representative terminal device in the second display region and displaying the second display screen of the second terminal device of the multiple terminal devices on which the third user input operation is received in the first display region as the switched representative device;
  receiving a fourth user input operation on the second display screen;
  in response to the designating the second terminal device as the switched representative device and the fourth user input operation:
    transmitting second information to the multiple terminal devices via the communication unit;
    displaying, in the first display region, a third screen that shows a result of the fourth user input operation to the switched representative device; and displaying, in the second display region, a fourth screen that shows a result of the fourth user input operation to the first terminal device of the multiple terminal devices other than the representative device.

6. The information processing method according to claim 5,
  wherein the multiple terminal devices include two or more terminal devices in addition to the representative terminal device, and
  further comprising:
    collectively displaying, in the second display region, copies of multiple screens that are displayed respectively on the two or more terminal devices and that show the result of the second user input operation on the first display screen to the two or more terminal devices.

7. The information processing method according to claim 5, further comprising:
  displaying, in a third display region, a window screen through which the processor receives a fifth user input operation for copying a file as a remote operation is displayed, the fifth user input operation for copying the file being designation of a destination of the file to be copied, the third display region being different from the first display region.

8. The information processing method according to claim 5,
wherein the first display screen in the first display region is for exclusive remote operation of the representative terminal device as well as collective remote operation of the multiple terminal devices,
wherein the information processing method comprises a mode reception to receive an input of selecting either one of a single mode and a batch mode,
wherein in the single mode, the user performs the exclusive remote operation of the representative terminal device, and
wherein in the batch mode, the user performs the collective remote operation of the multiple terminal devices.

9. A non-transitory computer-readable storage medium that stores a program executed by at least one processor of an information processing apparatus for remotely controlling multiple terminal devices, the information processing apparatus having a display screen having a first display region and a different second display region,
wherein the program causes the processor to:
receive a first user input operation to designate a first terminal device of the multiple terminal devices as a representative device for collective remote operation of the multiple terminal devices;
in response to the designating the first device as the representative device:
display a first display screen of the first device in the first display region,
display a second display screen in the second display region, the second display screen being displayed on a display of a second terminal device of the multiple terminal devices other than the representative terminal device and
receive a second user input operation on the first display screen,
in response to the designating the first device as the representative device and the second user input operation, the processor:
transmits first information to the multiple terminal devices via a communication unit;
displays, in the first display region, a first screen that shows a result of the second user input operation to the representative device; and
displays, in the second display region, a second screen that shows a result of the second user input operation to the second terminal device of the multiple terminal devices other than the representative device, and
receive a third user input operation to designate the second terminal device of the multiple terminal devices as a switched representative device;
in response to designating the second terminal device as the switched representative device, the processor:
does not perform a transmission process based on the third user input operation to the multiple terminal devices via the communication unit; and
displays the first display screen of the representative terminal device in the second display region and displays the second display screen of the second terminal device of the multiple terminal devices on which the third user input operation is received in the first display region as the switched representative device;
receive a fourth user input operation on the second display screen;
in response to the designating the second terminal device as the switched representative device and the fourth user input operation:
transmits second information to the multiple terminal devices via the communication unit;
displays, in the first display region, a third screen that shows a result of the fourth user input operation to the switched representative device; and displays, in the second display region, a fourth screen that shows a result of the fourth user input operation to the first terminal device of the multiple terminal devices other than the representative device.

10. The storage medium according to claim 9,
wherein the multiple terminal devices include two or more terminal devices in addition to the representative terminal device, and
wherein, the program causes the processor to:
collectively display, in the second display region, copies of multiple screens that are displayed respectively on the two or more terminal devices and that show the result of the second user input operation on the first display screen to the two or more terminal devices.

11. The storage medium according to claim 9,
wherein the program causes the processor to, in a third display region, a window screen through which the processor receives fifth a user input operation for copying a file as a remote operation, the fifth user input operation for copying the file being designation of a destination of the file to be copied, the third display region being different from the first display region.

12. The storage medium according to claim 9,
wherein the first display screen in the first display region is for exclusive remote operation of the representative terminal device as well as collective remote operation of the multiple terminal devices,
wherein the program causes the processor to execute a mode reception process to receive an input of selecting either one of a single mode and a batch mode,
wherein in the single mode, the processor allows a user to perform the exclusive remote operation of the representative device, and
wherein in the batch mode, the processor allows the user to perform the collective remote operation of the multiple terminal devices.

* * * * *

UNITED STATES PATENT AND TRADEMARK OFFICE
CERTIFICATE OF CORRECTION

| | |
|---|---|
| PATENT NO. | : 11,645,094 B2 |
| APPLICATION NO. | : 17/196773 |
| DATED | : May 9, 2023 |
| INVENTOR(S) | : Toru Sakai |

It is certified that error appears in the above-identified patent and that said Letters Patent is hereby corrected as shown below:

On the Title Page

In Item (56), under "U.S. PATENT DOCUMENTS", Line 3, delete "Humpieman" and insert -- Humpleman --, therefor.

In the Claims

In Column 18, Claim 10, Line 22, delete "storage" and insert -- non-transitory computer-readable storage --, therefor.

In Column 18, Claim 11, Line 33, delete "storage" and insert -- non-transitory computer-readable storage --, therefor.

In Column 18, Claim 11, Line 36, delete "fifth a user" and insert -- a fifth user --, therefor.

In Column 18, Claim 12, Line 41, delete "storage" and insert -- non-transitory computer-readable storage --, therefor.

Signed and Sealed this
Twenty-eighth Day of November, 2023

Katherine Kelly Vidal
*Director of the United States Patent and Trademark Office*